United States Patent
Kendall

[11] 3,760,898
[45] Sept. 25, 1973

[54] AUTOMOTIVE ANTI-THEFT AND SAFETY DEVICE

[76] Inventor: Patrick D. Kendall, 6566 Elizabeth St., Cass City, Mich. 48726

[22] Filed: Sept. 16, 1971

[21] Appl. No.: 181,056

[52] U.S. Cl............................ 180/114, 307/10 AT
[51] Int. Cl. .......................................... B60r 25/00
[58] Field of Search ............... 180/114; 307/10 AT; 340/63, 64; 123/198 DB, 198 DC

[56] References Cited
UNITED STATES PATENTS

| | | | |
|---|---|---|---|
| 3,354,980 | 11/1967 | Nielsen | 180/114 |
| 3,553,641 | 1/1971 | Moragne | 180/114 |
| 3,634,697 | 1/1972 | MacFarlane | 180/114 |
| 3,550,717 | 12/1970 | Doty | 180/114 |
| R27,108 | 3/1971 | Johnson et al. | 123/198 DB |

Primary Examiner—Kenneth H. Betts
Assistant Examiner—J. M. McCormack
Attorney—Clarence A. O'Brien and Harvey & Jacobson

[57] ABSTRACT

An anti-theft and safety device for vehicles and the like, said device comprising a normally closed solenoid-operated fuel valve connected to an SCR circuit which is adapted to be triggered through an ignition switch in the start position, thus preventing theft by by-passing the ignition switch. The device further includes an oil pressure or level responsive switch and an RC circuit which are effective to turn off the SCR in response to an adverse oil condition or related engine malfunction.

8 Claims, 2 Drawing Figures

PATENTED SEP 25 1973  3,760,898

Patrick D. Kendall
INVENTOR.

BY Clarence A. O'Brien
and Harvey B. Jacobson
Attorneys 3,760,898

AUTOMOTIVE ANTI-THEFT AND SAFETY DEVICE

The present invention is generally related to antitheft devices and, more particularly, to anti-theft devices for engine driven equipment.

In the past many vechicle anti-theft devices have been proposed or made commercially available. However, such constructions have either proven ineffective or have been too costly to manufacture and market. Several such conventional devices utilized solenoid operated valves in the fuel line to prevent the flow of fuel to the engine. However, these devices were ineffective since they were readily recognizable and extremely easy for a thief to "jump" or otherwise defeat.

While more effective anti-type theft devices have been proposed, such have been relatively complex in construction and too expensive to produce and manufacture on a successful basis. Furthermore, these devices served only a single function or purpose and were in no way coupled with the engine to achieve shut-off in the event of a malfunction in the oil system.

It is an object of the present invention to provide a novel anti-theft device including a solenoid-operated fuel valve actuated through a silicon controlled rectifier circuit in such a manner that the valve cannot be opened until the ignition switch has been turned to the start position, thereby preventing theft of the engine-driven equipment.

Another object of the present invention is to provide a versatile combination anti-theft and safety device for engine driven vehicles and the like which not only prevents theft but, also, is responsive to stop the engine in the event of a low oil pressure condition due to an accident or engine malfunction.

It is a further object of the present invention to provide a unique combination anti-theft and safety device which is effective to stop the flow of fuel to an engine by way of a normally-closed solenoid operated valve mounted in the fuel line.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
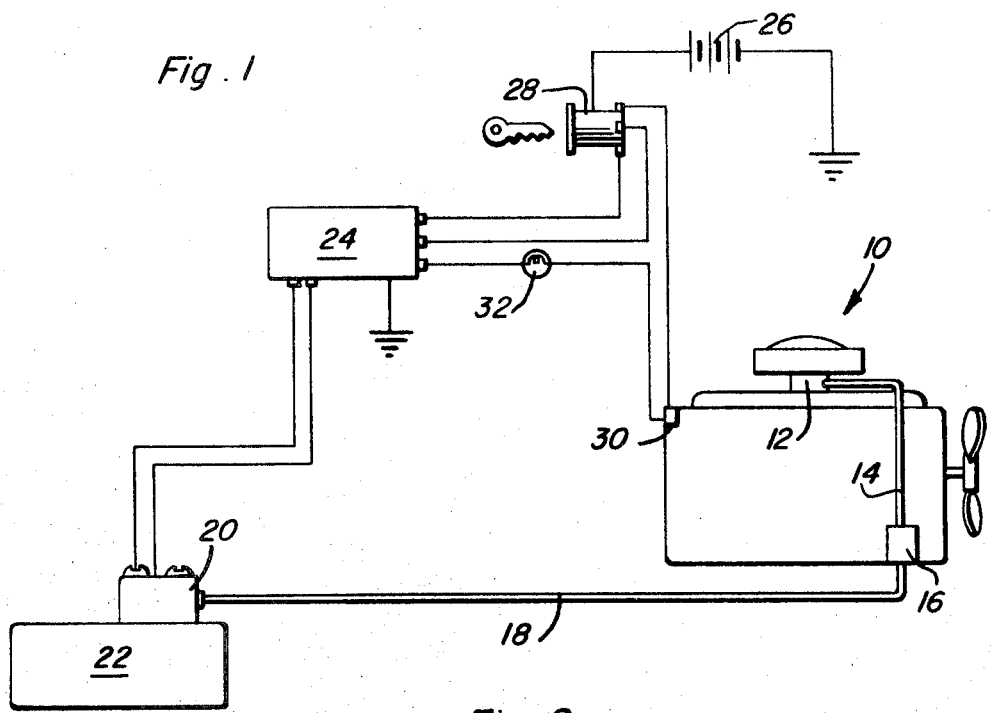
FIG. 1 is a diagram illustrating the connection of the anti-theft and safety device of the present invention to a conventional engine and fuel supply system.

Referring now, more particularly, to FIG. 1, a conventional fuel driven engine is generally indicated by the numeral 10 and includes a carbureter 12 adapted to receive fuel through a fuel line 14 by way of a fuel pump 16. Fuel is delivered to pump 16 by way of line 18 which is connected to a solenoid operated valve 20 mounted on or adjacent to a fuel tank indicated by the numeral 22. Thus, it will be appreciated that unless solenoid valve 20 is open, the flow of fuel to the engine from tank 22 will be interrupted. Of course, the lack of fuel renders the engine inoperative, thus making theft of the engine driven vehicle by jumping or other conventional theft techniques extremely difficult or nearly impossible.

When de-energized, solenoid valve 20 is in the fully closed position, opening of the valve being effected by way of electrical circuitry generally indicated by the numeral 24 connected to the vehicle ignition system. The ignition circuit includes a source of voltage 26, such as a conventional automotive battery, which is connected to a conventional multiposition ignition switch 28 of the key-operated type. The ignition switch is connected to circuit 24 and to a conventional oil pressure or level responsive switch 30 associated with the engine and provided with an adverse oil condition indicating light 32.

Figure 2:
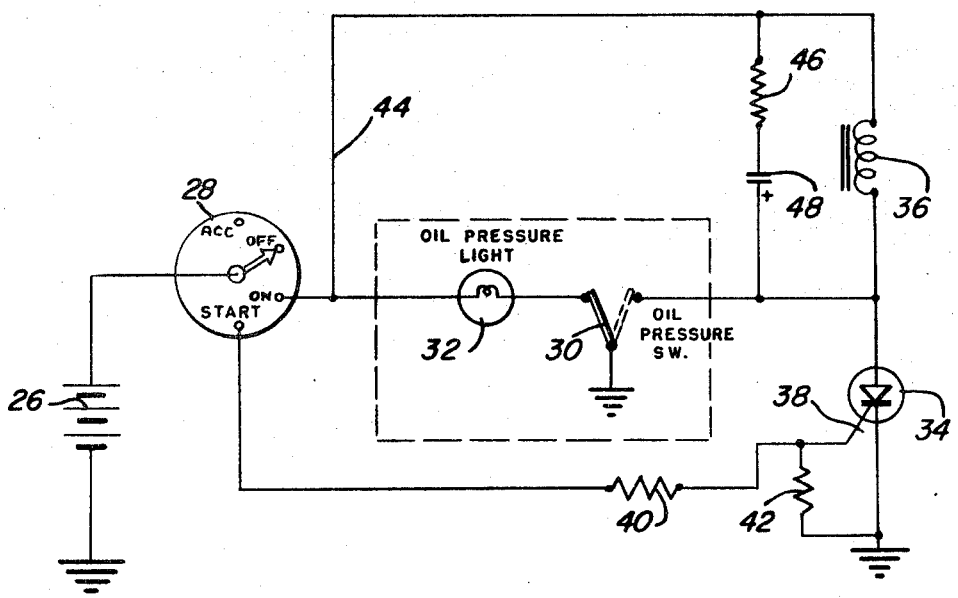
FIG. 2 is a schematic of the electrical circuitry associated with the present invention.

Referring to FIG. 2, the details of the circuitry associated with the present invention may be more fully understood. The capabilities of the circuit are accredited to the use of a silicon controlled rectifier indicated by the numeral 34 and having its cathode connected to ground and anode connected to a solenoid coil 36 associated with solenoid valve 20 mounted in the fuel line, as explained above. The battery power is supplied through ignition switch 28 which is of the conventional type and includes a plurality of contacts associated with the different positions. The circuitry is also provided with a conventional oil condition switch 30, preferably of the pressure or level responsive type, and associated indicating light 32. When the engine is not operating or when the oil pressure drops below a predetermined level, the switch is in the left position illustrated in FIG. 2. Under proper engine running conditions, the switch is shifted to the right position, the purpose of which is hereinafter explained.

The operation of the circuitry may be explained as follows. During the starting of the engine, the ignition switch must first pass by the "on position" to reach the "start position". Thus, the oil pressure light is energized with the switch in the "on " position. However, current will not flow through solenoid coil 36 until silicon controlled rectifier 34 has been triggered. This is achieved by connecting trigger lead 38 to the ignition switch such that current flows thereto when the ignition switch is in the "start" position. In the preferred embodiment, only 0.2 volt is required to trigger the SCR with a pulse duration of approximately 10 microseconds. The voltage which is impressed upon gate lead 38 is reduced by resistors 40 and 42 which serve as a voltage divider to obtain the proper trigger voltage.

As is common with most modern ignition switches, the oil pressure light and various other circuits remain connected to the battery when the ignition switch is in either the "on" or "start" positions and during movement between these positions. Thus, coil 36 remains connected to battery 26 by line 44 when ignition switch 28 is moved between the "on" and "start" positions.

After the engine has been started, the ignition switch is returned to the "on" position. Current continues to flow through lead 44 to energize solenoid coil 36, thereby opening the fuel valve. As the oil pressure builds up, switch 30 is actuated to its normal operating position, thereby de-energizing indicating light 32. With switch 30 in its normal position, current for solenoid coil 36 flows to ground through switch 30, rather than SCR 34. In effect, the SCR is no longer a part of the solenoid coil circuit, but is still in the triggered condition.

In order to turn off the SCR, a resistance capacitive RC network is employed in conjuction with switch 30. In the preferred embodiment, the RC network is comprised of a resistor 46 in series with a polarized capacitor 48, having its positive lead connected to the anode of the SCR, the resistor and capacitor being in parallel with solenoid coil 36. If switch 30 should return to the left in response to a low oil pressure condition, or should ignition switch 28 be turned to the off position, the energy stored across capacitor 48 will be discharged in a direction opposite to that of the applied voltage. This creates a reverse current greater than the holding current required to maintain the SCR in operation, thus causing turn off of the circuit. Thus, it will be appreciated that the SCR is utilized to perform both anti-theft and low oil pressure functions.

From the foregoing description, it will be appreciated that the versatility of the device of the present invention provides a plurality of purposes not provided by such conventional devices. These functions may be listed as follows:

1. Theft Device:

Since the fuel valve is normally in the closed position, no fuel can flow to the carburetor. To attempt to jump or hot wire the circuit would be futile since no voltage can be applied to the gate of the SCR without the use of the ignition key. Even if a thief was successful in jumping the SCR a voltage higher than 8 volts would destroy the circuitry, thereby making engine starting impossible.

2. Low Oil Level:

If the oil level of the engine falls below a predetermined amount, switch 30 will release and shut off the solenoid operated fuel valve by turning off the SCR, as explained above.

3. Fuel Leakage:

In the event of fuel leakage at the carbureter or fuel pump or along the fuel line, closure of the solenoid valve will eliminate further leakage from the fuel tank.

4. Hard Starting:

Many engines are difficult to start when fuel is not present in the carburetor. By closure of the solenoid fuel valve after each use of the engine, fuel present in the carbureter will not feed back into the fuel tank by way of gravity thus maintaining fuel in the carbureter for subsequent starting.

5. Fire Safety:

In the event of an accident, the engine will be automatically shut off by closure of the solenoid operated fuel valve due to low oil level or pressure or ignition switch actuation.

It should be noted that while the above described circuitry is designed for negative ground systems, it may also be utilized with positive ground systems with minor changes, such being deemed to fall within the scope of the present invention. Furthermore, the device of the present invention is not limited to use with passenger vehicles and may be used with any fuel-burning engine utilizing an electrical ignition system. As such, the anti-theft and safety device may be used with trucks, heavy industrial tractors, graders, cranes, or farming equipment such as combines and tractors. The device may also prevent the unauthorized use of engine-driven power plants or inboard marine engines.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A device comprising valve means for controlling the flow of fuel to an engine and circuit means for energizing and de-energizing said valve means, said circuit means including a source of voltage, first switch means between said source of voltage and said valve means, and second switch means in series with said valve means and being enabled by said first switch means to energize said valve means to permit thP flow of fuel therethrough, said second switch means including a silicon controlled rectifier in series with said valve means, said first switch means being movable to a first position for connecting one side of said voltage source to said valve means and a second position for triggering said silicon controlled rectifier and maintaining said valve means connected to the voltage source, said valve means including electrical coil means in series with said silicon controlled rectifier and said first switch means when in either said first position or said second position, said circuit means including oil condition responsive switch means connecting one side of said coil means to ground for energization thereof when in a first position and effectively disconnecting said voltage source from the other side of said coil when in a second position thereby deenergizing said coil means, said circuit means including capacitive circuit means connected in parallel with said coil means for turning off said silicon controlled rectifier when said oil condition responsive switch means is in said second position.

2. An anti-theft and safety device for connection to an engine electrical ignition system having a source of voltage, an oil condition responsive switch and a multiposition ignition switch, said device comprising: an electrically operated fuel valve adapted to be inserted into the engine fuel supply line and including an electrical coil adapted to be connected at one end thereof to the ignition switch, a silicon controlled rectifier connected to the opposite end of said coil and having a gate lead adapted to be connected to the ignition switch for triggering of said silicon controlled rectifier, said silicon controlled rectifier and said coil being adapted to be connected to the oil condition responsive switch for grounding therethrough.

3. An anti-theft and safety device for connection to an engine electrical ignition system having a source of voltage, an oil condition responsive switch and a multiposition ignition switch, said device comprising: an electrically operated fuel valve adapted to be inserted into the engine fuel supply line and including an electrical coil adapted to be connected at one end thereof to the ignition switch, a silicon controlled rectifier connected to the opposite end of said coil and having a gate lead adapted to be connected to the ignition switch for triggering of said silicon controlled rectifier, said device including a capacitive circuit in parallel with said coil for turning off said silicon controlled rectifier.

4. The structure set forth in claim 3 wherein said silicon controlled rectifier and said coil are adapted to be connected to the oil condition responsive switch for grounding therethrough.

5. The structure set forth in claim 4 wherein said device includes electrical resistance means connected between said gate lead and the ignition switch for attenuating the voltage from the voltage source when triggering said silicon controlled rectifier.

6. A vehicle anti-theft and safety system comprising: a voltage source, oil condition responsive switch means for completing a circuit under predetermined vehicle malfunctions, electrical coil means for inhibiting operation of a component of the vehicle when said coil means is energized, ignition switch means for selectively serially connecting said oil condition responsive switch means and said coil means to a first side of said voltage source, said coil means including a coil connected in series at one end to said ignition switch means, and gated switch means for connecting the opposite end of said coil to the second side of said voltage source, said gated switch means including a gate lead connected to said ignition switch means, said ignition switch means including on and start positions whereby said ignition switch means connects said gate lead to said voltage source only when in said start position to enable said gated switch means and serially connects said oil condition responsive switch means and said one end of said coil to said voltage source when in both of said on and start positions.

7. The system set forth in claim 6 including capacitive circuit means in parallel with said coil for disabling said gated switch means when said oil condition responsive switch means senses a malfunction.

8. The system set forth in claim 7 wherein said gated switch means includes a silicon controlled rectifier serially connected to said opposite end of said coil.

* * * * *